(12) United States Patent
Teng et al.

(10) Patent No.: US 9,734,209 B1
(45) Date of Patent: Aug. 15, 2017

(54) CHRONOLOGICAL SORTING OF ITEMS RANKED ACCORDING TO A SCORE

(71) Applicant: Google Inc., Mountain View, CA (US)

(72) Inventors: Junbin Teng, Cupertino, CA (US);
Andre Rohe, Mountain View, CA (US);
Chih-Wei Chen, Sunnyvale, CA (US);
Boris Mazniker, San Francisco, CA (US)

(73) Assignee: Google Inc., Mountain View, CA (US)

( * ) Notice: Subject to any disclaimer, the term of this patent is extended or adjusted under 35 U.S.C. 154(b) by 445 days.

(21) Appl. No.: 14/040,455

(22) Filed: Sep. 27, 2013

Related U.S. Application Data

(60) Provisional application No. 61/707,870, filed on Sep. 28, 2012.

(51) Int. Cl.
*G06F 17/30* (2006.01)

(52) U.S. Cl.
CPC .................. *G06F 17/3053* (2013.01)

(58) Field of Classification Search
CPC .................................................. G06F 17/3053
See application file for complete search history.

(56) References Cited

U.S. PATENT DOCUMENTS

| | | | |
|---|---|---|---|
| 2007/0219994 A1* | 9/2007 | Lemelson | G06F 17/30864 |
| 2010/0262658 A1* | 10/2010 | Mesnage | G06Q 10/06 709/204 |
| 2011/0022602 A1* | 1/2011 | Luo | G06Q 10/10 707/748 |
| 2012/0036080 A1* | 2/2012 | Singer | G06Q 10/10 705/319 |
| 2012/0117059 A1* | 5/2012 | Bailey | G06F 17/30867 707/723 |
| 2012/0143963 A1* | 6/2012 | Kennberg | G06Q 10/107 709/206 |
| 2013/0139048 A1* | 5/2013 | Dhawan | G06Q 30/0278 715/234 |

* cited by examiner

*Primary Examiner* — Mohammad S Rostami
(74) *Attorney, Agent, or Firm* — McDermott Will & Emery LLP

(57) ABSTRACT

In one aspect, a method includes identifying a plurality of posts, each of the plurality of post being associated with a score and a time, the plurality of posts being ranked according to the score associated with each post, selecting a first post of the plurality of posts as a candidate post, determining a score threshold and time threshold associated with the candidate post, determining if one or more posts of the plurality of posts meet the score threshold and the time threshold associated with the candidate post and reordering the candidate post and the one or more posts according to the time associated with each of the candidate post and the one or more posts when it is determined that one or more posts meet the score threshold and the time threshold.

16 Claims, 3 Drawing Sheets

CHRONOLOGICAL SORTING OF ITEMS RANKED ACCORDING TO A SCORE

CROSS-REFERENCE TO RELATED APPLICATION

The present application claims the benefit of U.S. Provisional patent application Ser. No. 61/707,870, entitled "Chronological Sorting of Items Ranked According to a Score," filed on Sep. 28, 2012, which is hereby incorporated by reference in its entirety for all purposes.

BACKGROUND

Users of a social networking service and other search based media may view one or more posts being presented in a chronological manner. Such manner of sorting posts presented to a user provides the user with a predictable ranking of results.

While chronological ranking of posts provides such advantages, it may be beneficial to rank posts using other techniques including the quality of such posts to provide the user with the best quality posts on top of the results. However, users are likely to become confused as to the reasons why posts are ranked in a certain seemingly random manner when such ranking of posts provides the posts in a non-chronological order.

SUMMARY

The disclosed subject matter relates to a machine-implemented method including identifying a plurality of posts, each of the plurality of post being associated with a score and a time, where the plurality of posts are ranked according to the score associated with each post. The method further including selecting a first post of the plurality of posts as a candidate post. The method further including determining a score threshold and time threshold associated with the candidate post. The method further including determining if one or more posts of the plurality of posts meet the score threshold and the time threshold associated with the candidate post. The method further including reordering the candidate post and the one or more posts that meet the score threshold and the time threshold according to the time associated with each of the candidate post and the one or more posts that meet the score threshold and the time threshold, when it is determined that one or more posts meet the score threshold and the time threshold. Other aspects can be embodied in corresponding systems and apparatus, including computer program products.

These and other aspects can include one or more of the following features. The method may further include determining that all posts of the plurality of posts have been considered for reordering and providing the plurality of posts according to the ranking.

A post may be considered for reordering if it is selected as a candidate post or meets a score threshold or time threshold associated with a candidate post. A post may be considered for reordering if it is selected as a candidate post or meets a score threshold and time threshold associated with a candidate post. The method may further include determining that one or more posts of the plurality of the posts have not yet been considered for reordering, selecting the next post of the plurality of posts not yet considered for reordering as the next candidate post, determining a second score threshold and second time threshold associated with the next candidate post, determining if one or more other posts of the plurality of posts not yet considered for reordering meet the second score threshold and the second time threshold and reordering the next candidate post and the one or more other posts according to the time associated with the next candidate post and the one or more other posts, when it is determined that one or more other posts meet the second score threshold and the second time threshold.

The score threshold may include a pre-defined score difference. A post may meet the score threshold if the difference between the score of the post and the candidate post is less than or equal to the pre-defined score difference. The score threshold may be provided as a pre-defined ratio of the candidate score. The method may further include determining a threshold score by multiplying the pre-defined ratio and the candidate score, where a post meets the score threshold if the score of the post is bigger than or equal to the threshold score. The time threshold includes a pre-defined time difference. A post may meet the time threshold if the difference between the time associated with the post and the time associated with the candidate post is smaller than or equal to the pre-defined time difference. The score threshold and the time threshold for each candidate post may be dependent on the position of the post with respect to the other posts of the plurality of posts.

The determining step may include determining, in order, for each post ranked after the candidate post, if the post meets the score threshold and time threshold and terminating the determination step when at least one post does not meet the score threshold. The score may include a quality score.

The disclosed subject matter also relates to a system including one or more processors and a machine-readable medium including instructions stored therein, which when executed by the processors, cause the processors to perform operations including identifying a plurality of posts, each of the plurality of post being associated with a score and a time, where the plurality of posts are ranked according to the score associated with each post. The operations further including selecting a first post of the plurality of posts as a candidate post. The operations further including determining if a score and time associated with one or more posts of the plurality of posts ranked after the candidate post satisfy a condition with respect to the score and time associated with the candidate post and reordering the candidate post and the one or more posts according to the time associated with each of the candidate post and the one or more posts, when it is determined that a score and time associated with one or more posts of the plurality of posts ranked after the candidate post satisfy a condition with respect to the score and time associated with the candidate post. Other aspects can be embodied in corresponding systems and apparatus, including computer program products.

These and other aspects can include one or more of the following features. The condition may include the score and the time associated with a post meeting a score threshold and time threshold associated with the candidate post. The operations may further include determining the score threshold and the time threshold associated with the candidate post. The operations may further include determining if all of the plurality of posts have been considered for reordering, wherein a post is considered for reordering if it is selected as a candidate post or meets the time and score threshold with respect to a candidate post, selecting the next post of the plurality of posts not yet considered for reordering as the candidate post if all of the plurality of posts have not been processed and providing the one or more posts according to the ranking if all of the plurality of posts have been considered for reordering.

The disclosed subject matter also relates to a machine-readable medium including instructions stored therein, which when executed by a machine, cause the machine to perform operations including identifying a plurality of posts, each of the plurality of post being associated with a score and a time, where the plurality of posts are ranked according to the score associated with each post. The operations further including selecting a first post of the plurality of posts not yet considered for reordering as a candidate post. The operations further including determining that a score and time associated with one or more posts of the plurality of posts ranked after the candidate post satisfy a condition with respect to the score and time associated with the candidate post. The operations further including reordering the candidate post and the one or more posts according to the time associated with each of the candidate post and the one or more posts. The operations further including determining if all of the plurality of posts have been considered for reordering. The operations further including providing the one or more posts according to the ranking if all of the plurality of posts have been considered for reordering and selecting the next unprocessed post of the plurality of posts as the candidate post if all of the plurality of posts have not been processed. Other aspects can be embodied in corresponding systems and apparatus, including computer program products.

These and other aspects can include one or more of the following features. The condition may include the score and the time associated with a post meeting a score threshold and time threshold associated with the candidate post.

This and other aspects described throughout the specification provide various advantages, including, but not limited to, facilitating ranking of posts in a manner that provides a balance between advantages provided by score-based ranking of posts provided to a user (e.g., ranking based on quality score, diversity score, user preference, topicality, etc.), and a relatively chronological ordering of such posts as to provide the user with predictability.

It is understood that other configurations of the subject technology will become readily apparent from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several implementations of the subject technology are set forth in the following figures.

DETAILED DESCRIPTION

Figure 1:
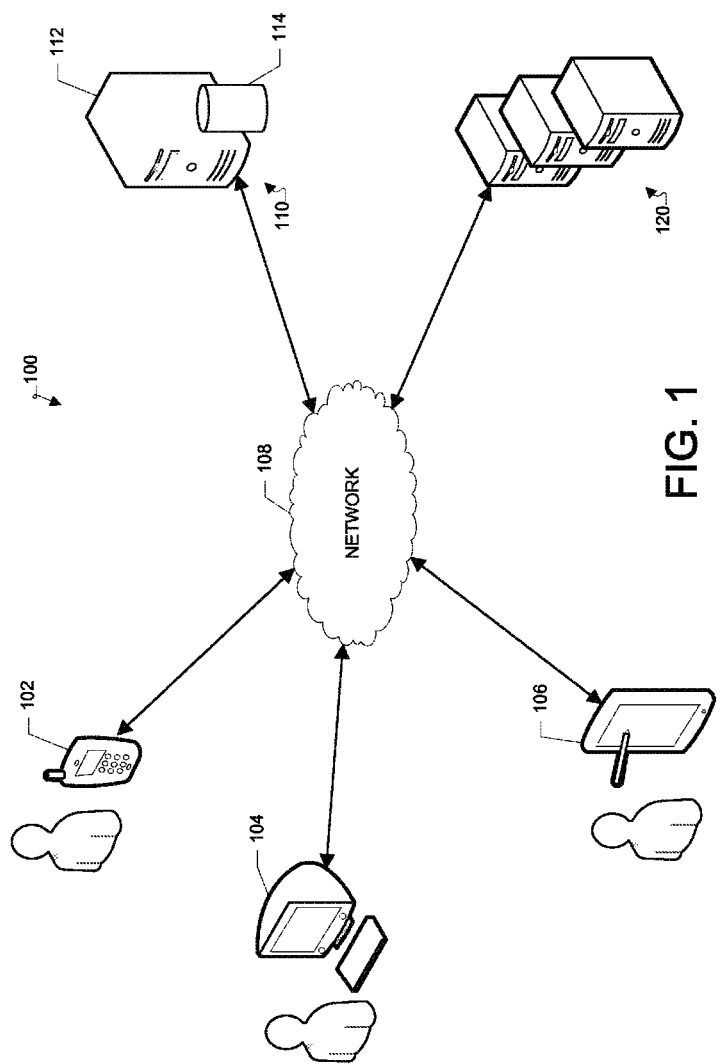
FIG. 1 illustrates an example client-server network environment, which provides for chronological ranking of posts sorted according to score-based criteria.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent that the subject technology is not limited to the specific details set forth herein and may be practiced without these specific details.

The subject disclosure provides a method and system for facilitating ranking of posts in a manner that provides a balance between advantages provided by score-based ranking of posts provided to a user (e.g., ranking based on quality score, diversity score, user preference, topicality, etc.), and a relatively chronological ordering of such posts as to provide the user with predictability.

In one example, the system identifies a plurality of posts being ranked according to a score (or more than one score) calculated based on one or more criteria including, for example, quality, diversity, user activity, user preferences, topicality and/or other similar criteria. Because the items are sorted based on score(s) calculated according to one or more criteria other than freshness, the posts may be sorted in a non-chronological manner. Such ordering of the posts may lead to user confusion as to the reason posts are presented in a certain order. That is, most users may expect posts to be displayed within a social stream (or other similar services where posts are generated in a time-based manner) according to time.

To address the non-chronological nature of the ranking of the post, the system may determine if the ordering of posts as sorted according to the score-based criteria is not in balance with the chronological ordering of the posts (e.g., an ordering that may lead to user confusion and/or user dissatisfaction) and may reorder the posts to restore the chronological ranking of the posts. The system provides a method of balancing score-based and time-based ranking of posts by determining when posts are close in score and time (e.g., meet a threshold), and restoring the chronological ordering of posts when it is determined that the posts are close enough in both score and time, such that it is likely that the benefits of a predictable ranking of posts in a chronological manner outweighs the score-based (e.g., quality-based) ranking of such posts.

In one example, the system identifies a plurality of posts being ranked according to a first score (e.g., a quality score). A time associated with each post is further determined. The time associated with each post may refer to the time the post was generated, updated, stored and/or provided for viewing to one or more users of a social networking service. The system then selects the first post of the plurality of posts (e.g., the post ranked highest with the listing of posts) as the candidate post. The post may consist of a post at a social networking site and may include a text, document, video, audio, a link, or other various media.

The system next determines a score threshold and time threshold associated with the candidate post. One or both the threshold may comprise a pre-defined and/or pre-stored value. In one example, the score threshold may be a difference between the score associated with the candidate post and another post. In another example, the score threshold may be expressed as ratio of the score of the candidate post. In one example, one or both the thresholds may be customized for each candidate post. For example, for the first one or more candidate posts (e.g., having a threshold score, or for a specific number of scores), the system may assign as score threshold such that only posts with a small difference in score from the candidate post meet the score threshold (e.g., a large ratio or smaller score difference), and/or where a smaller time difference between an post and the candidate post may satisfy the time threshold. However, as the process moves further down the list of posts, the thresholds may allow for a bigger difference of score and/or time between two posts. This may, for example, be due to the fact that the highest ranked posts within the list are presented first to the user and it may be desirable to provide the user with posts that have higher scores rather than a chronological ordering, whereas as the posts move down the list, the score of the posts may not be as important.

Next, the system compares the next one or more posts in the list to determine if one or more posts meet the score and time threshold with respect to the candidate post. In one example, because the list is ordered according to the score of each post, the process stops once at least one post within the list does not meet the score threshold, because all other posts within the posts have a lower score and will not meet the threshold. Similarly, in another example, the determination is terminated with respect to a candidate post once at least one post within the list does not meet the time threshold corresponding to that candidate post. The first post that does not meet the score threshold and/or the time threshold is selected as the next candidate post, in one example. Where one or more posts meet the score and time threshold, it is determined that the posts are close in time and score to the candidate post. The system reorders the candidate posts and the one or more posts satisfying the condition to restore the chronological ordering of the posts (e.g., since the score is close enough, where there is more benefit from restoring the chronological order of the posts to avoid user confusion than to provide an post on top of the list due to its higher score). The posts having been resorted are then considered to be processed and/or identified as being considered for reordering. That is, a post is considered for reordering when the post is selected as a candidate post or meets the time and/or score threshold with respect to a candidate post.

If, on the other hand there are no posts that meet both the score and time threshold with respect to the candidate post, the process continues to select the next post within the list as the candidate post. Similarly, after reordering the candidate post and the one or more posts that satisfy the condition (e.g., meeting both thresholds), the system continues to selects the next unprocessed post as the next candidate post. The process then continues until all posts in the list have been processed. In one example, a post is considered process if it is selected as a candidate score or when the post meets the score threshold and/or time threshold with respect to a candidate post.

Users of social networking services may create associations with one another. The phrase "social networking service" as used herein encompasses its plain and ordinary meaning, including, but not limited to, an online service, platform or site that focuses on building and reflecting of social associations among users. These associations may be stored within a social graph at each social networking service (e.g., maintained at remote server(s) 120). Such user associations may be defined on a user-to-user basis, or as a group of users associated through membership within a group. As used herein, "contacts" refer to other users that a user is associated with, at one or more social networking services.

FIG. 1 illustrates an example client-server network environment, which provides for chronological ranking of posts sorted according to score-based criteria. A network environment 100 includes a number of electronic devices 102, 104, 106 communicably connected to a server 110 and remote servers 120 by a network 108. Network 108 can be a public communication network (e.g., the Internet, cellular data network, dialup modems over a telephone network) or a private communications network (e.g., private LAN, leased lines). Further, network 108 can include, but is not limited to, any one or more of the following network topologies, including a bus network, a star network, a ring network, a mesh network, a star-bus network, a tree or hierarchical network, and the like.

In some example implementations, electronic devices 102, 104, 106 can be computing devices such as laptop or desktop computers, smartphones, PDAs, portable media players, tablet computers, or other appropriate computing devices. In the example of FIG. 1, electronic device 102 is depicted as a smartphone, electronic device 104 is depicted as a desktop computer and electronic device 106 is depicted as a PDA.

In some implementations, server 110 includes a processing device 112 and a data store 114. Processing device 112 executes computer instructions stored in data store 114, for example, to facilitate chronological ranking of posts ranked according to a score for display to users interacting with electronic devices 102, 104, 106. Server 110 may further be in communication with remote servers 120 either through the network 108 or through another network or communication means.

According to some aspects, remote servers 120 can be any system or device having a processor, a memory and communications capability for hosting various remote social networking services and/or search engines. Remote servers 120 may be further capable of maintaining social graphs of users and their contacts. The remote social networking services hosted on the remote server 120 may enable users to create a profile and associate themselves with other users at a remote social networking service. The remote servers 120 may further facilitate the generation and maintenance of a social graph including the user created associations. The social graphs may include, for example, a list of all users of the remote social networking service and their associations with other users of a remote social networking service.

In some example aspects, server 110 and/or one or more remote servers 120 can be a single computing device such as a computer server. In other implementations, server 110 and/or one or more remote servers 120 can represent more than one computing device working together to perform the actions of a server computer (e.g., cloud computing). Server 110 and/or one or more remote servers 120 may be coupled with various remote databases or storage services. While server 110 and the one or more remote servers 120 are displayed as being remote from one another, it should be understood that the functions performed by these servers may be performed within a single server, or across multiple servers.

Communications between the client devices 102, 104, 106, server 110 and/or one or more remote servers 120 may be facilitated through the HTTP communication protocol. Other communication protocols may also be facilitated including for example, XMPP communication, for some or all communications between the client devices 102, 104, 106, server 110 and one or more remote servers 120 (e.g., through network 108).

Users may interact with the system hosted by server 110, and/or one or more social networking services hosted by remote servers 120, through a client application installed at the electronic devices 102, 104, 106. Alternatively, the user may interact with the system and the one or more social networking services through a web based browser application at the electronic devices 102, 104, 106. Communication between client devices 102, 104, 106 and the system, and/or one or more social networking services, may be facilitated through a network (e.g., network 108).

The network 108 can include, for example, any one or more of a personal area network (PAN), a local area network (LAN), a campus area network (CAN), a metropolitan area network (MAN), a wide area network (WAN), a broadband network (BBN), the Internet, and the like. Further, the network 108 can include, but is not limited to, any one or more of the following network topologies, including a bus network, a star network, a ring network, a mesh network, a star-bus network, tree or hierarchical network, and the like.

Figure 2:
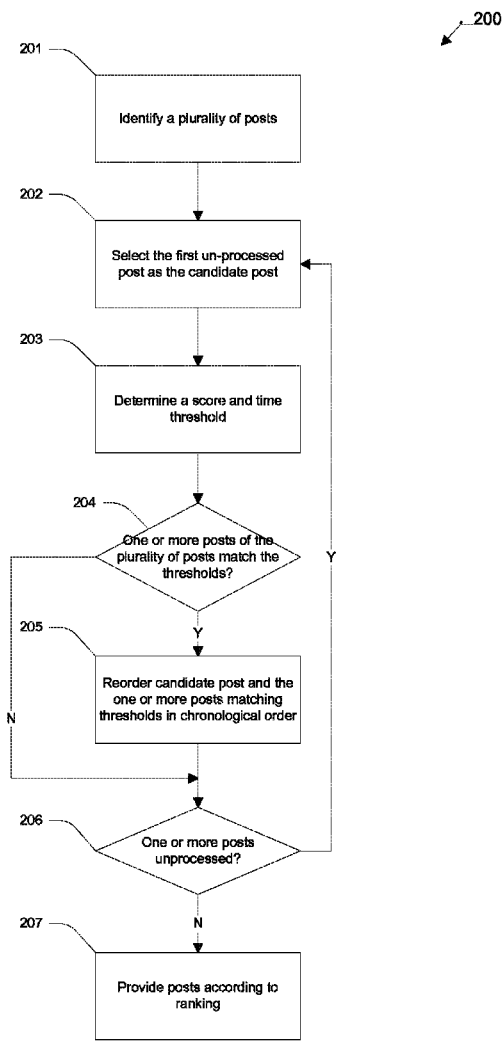
FIG. 2 illustrates a flow diagram of an example process 200 for time-based ranking of posts ranked according to score-based criteria.

FIG. 2 illustrates a flow diagram of an example process 200 for time-based ranking of posts ranked according to score-based criteria. In step 201, the system identifies a plurality of posts being ranked according to a score. For example, the one or more posts may be ranked according to a quality score associated with each of the one or more posts. The quality score may be determined based on various criteria including post popularity, affinity of user to which the post is being provided and the post owner and freshness. Each post may further be associated with a time (e.g., a time stamp) indicating the time the post was generated, updated, stored and/or made available for viewing by one or more users.

In step 202, the system selects the first unprocessed post of the plurality of posts (e.g., the highest ranked unprocessed post) as the candidate post. A post in considered processed if one of two conditions is met. First, in one example, a post is processed when it is selected as a candidate post. Additionally, a post may be considered processed when the post meets a score and/or time threshold associated with a candidate post. In one example, when process 200 begins for a list of posts, the first post within the plurality of posts (e.g., post ranked highest and having the highest quality score) is selected as the first candidate post.

In step 203, the system determines a score threshold and time threshold associated with the candidate post. In one example, the score threshold may be a difference between the score assigned to the candidate post and the other posts of the plurality of posts. A post, in this instance, is determined to meet the score threshold if the difference of the score of the post and the score of the candidate post is less than the score difference identified as the score threshold. In another example, the score threshold may be expressed as ratio of the score of the candidate post. The system may determine a threshold score by multiplying the ratio with the score of the candidate post. In such example, a post may satisfy the threshold where the score of the post is above the calculated threshold score (e.g., bigger than the pre-defined ratio of the candidate score). The time threshold may be expressed as a time difference between the time stamps associated with each post.

In step 204, the system compares the one or more posts of the plurality of posts to determine if one or more posts meet the score threshold and time threshold associated with the candidate post. In one example, because the list is ordered according to the score of each post, the determination in step 204 is terminated with respect to a candidate post once at least one post within the list does not meet the score threshold corresponding to that candidate post. In one example, this is because all other posts of the plurality of posts are considered to have a lower score and thus will not meet the score threshold. In another example, the determination in step 204 is terminated with respect to a candidate post once at least one post within the list does not meet the time threshold corresponding to that candidate post. The first post that does not meet the score threshold and/or the time threshold is selected as the next candidate post, in one example. Where one or more posts meet the score and time threshold, it is determined that the posts are close in time and score to the candidate post, and the process continues to step 205.

In step 205, the candidate post and one or more posts are reordered to restore the chronological ordering of the posts (e.g., since the score is close enough, there may be more benefit to restore the chronological order of the posts to avoid user confusion than to provide an post on top of the list due to its higher score). That is, the system determines the time stamp for each of the candidate post and the one or more posts satisfying both the score and time threshold, and ranks the posts according to their time stamp (e.g., the freshest post being ranked first). The posts having been resorted are then considered to be processed. In one example, once step 205 is completed, the ranking and placement of the candidate post and the one or more post satisfying the conditions with respect to the candidate post is changed with respect to one another within the plurality of posts. In one example, the ranking and placement of other posts within the list might not be altered. Once step 205 is completed, the process continues to step 206. Similarly, if, in step 204, it is determined that no posts meet both the score and time threshold with respect to the candidate post, the process continues to step 206.

In step 206, the system determines if one or more unprocessed posts remain within the list. If, in step 206, the system determines that one or more posts are unprocessed, the system returns to step 202 and selects the next unprocessed post as the candidate post (e.g., the first post that does not meet the score threshold and/or time threshold with respect to the previous candidate post) and steps 202-206 are repeated until all of the plurality of posts have been processed. Once the system determines that all posts have been processed, in step 206, in step 207, the system provides the plurality of posts according to the ranking achieved as a result of process 200.

The systems and processes described here are described with respect to posts being generated, stored and/or provided for displayed within a social networking service for exemplary purposes. Same or similar systems and processes may be used with respect to one or more other items and/or one or more other services, systems and or infrastructures to provide similar advantages to users. For example, in one example, the systems and processes described above may be used in a search environment for providing a user with search results (e.g., one or more items), for example, in response to a search query.

In situations in which the system and processes discussed here collect or make use of personal information about users, the users may be provided with an opportunity to control whether and/or to what extent the programs or features collect and make use of such user information (e.g., information about user social network, contacts, user preferences, historical activity, profile information), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

In addition, where information regarding content generated by the user is stored and/or shared with one or more other users, various privacy controls may be employed to facilitate protecting the storing and/or sharing of such content to the extent that the content includes personal data or to the extent that the user has selected to limit the visibility of the data to one or more other users.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 3:
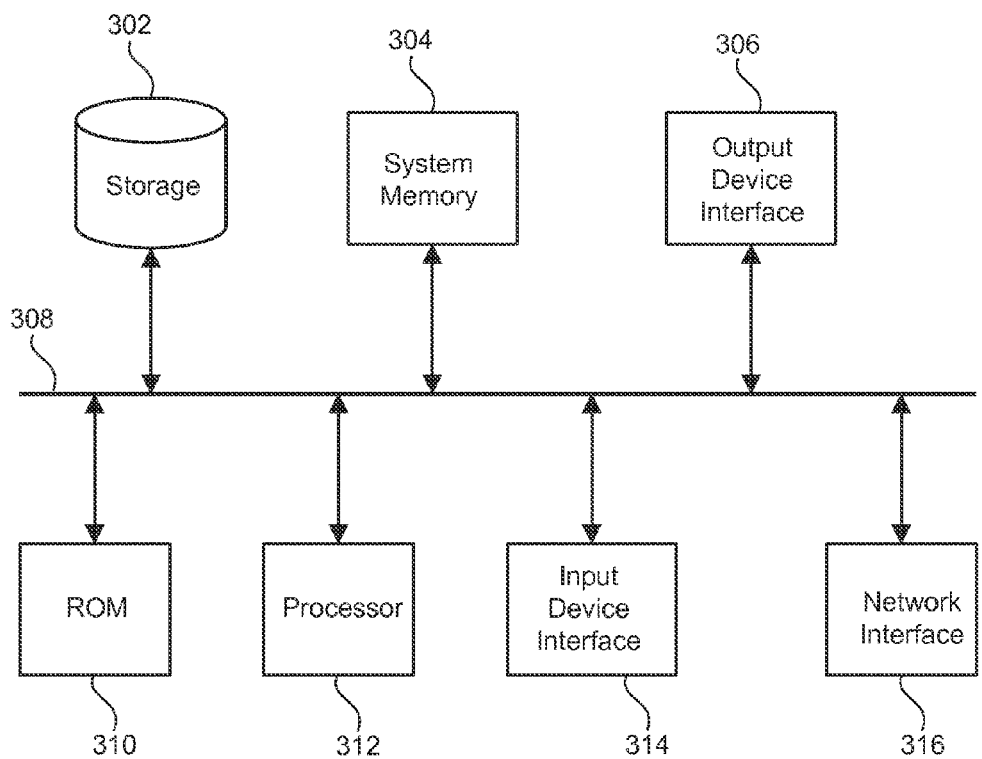
FIG. 3 conceptually illustrates an electronic system with which some implementations of the subject technology are implemented.

FIG. 3 conceptually illustrates an electronic system with which some implementations of the subject technology are implemented. Electronic system 300 can be a server, computer, phone, PDA, laptop, tablet computer, television with one or more processors embedded therein or coupled thereto, or any other sort of electronic device. Such an electronic system includes various types of computer readable media and interfaces for various other types of computer readable media. Electronic system 300 includes a bus 308, processing unit(s) 312, a system memory 304, a read-only memory (ROM) 310, a permanent storage device 302, an input device interface 314, an output device interface 306, and a network interface 316.

Bus 308 collectively represents all system, peripheral, and chipset buses that communicatively connect the numerous internal devices of electronic system 300. For instance, bus 308 communicatively connects processing unit(s) 312 with ROM 310, system memory 304, and permanent storage device 302.

From these various memory units, processing unit(s) 312 retrieves instructions to execute and data to process in order to execute the processes of the subject disclosure. The processing unit(s) can be a single processor or a multi-core processor in different implementations.

ROM 310 stores static data and instructions that are needed by processing unit(s) 312 and other modules of the electronic system. Permanent storage device 302, on the other hand, is a read-and-write memory device. This device is a non-volatile memory unit that stores instructions and data even when electronic system 300 is off. Some implementations of the subject disclosure use a mass-storage device (such as a magnetic or optical disk and its corresponding disk drive) as permanent storage device 302.

Other implementations use a removable storage device (such as a floppy disk, flash drive, and its corresponding disk drive) as permanent storage device 302. Like permanent storage device 302, system memory 304 is a read-and-write memory device. However, unlike storage device 302, system memory 304 is a volatile read-and-write memory, such a random access memory. System memory 304 stores some of the instructions and data that the processor needs at runtime. In some implementations, the processes of the subject disclosure are stored in system memory 304, permanent storage device 302, and/or ROM 310. For example, the various memory units include instructions for time-based ranking of posts ranked according to score-based criteria. From these various memory units, processing unit(s) 312 retrieves instructions to execute and data to process in order to execute the processes of some implementations.

Bus 308 also connects to input and output device interfaces 314 and 306. Input device interface 314 enables the user to communicate information and select commands to the electronic system. Input devices used with input device interface 314 include, for example, alphanumeric keyboards and pointing devices (also called "cursor control devices"). Output device interfaces 306 enables, for example, the display of images generated by the electronic system 300. Output devices used with output device interface 306 include, for example, printers and display devices, such as cathode ray tubes (CRT) or liquid crystal displays (LCD). Some implementations include devices such as a touchscreen that functions as both input and output devices.

Finally, as shown in FIG. 3, bus 308 also couples electronic system 300 to a network (not shown) through a network interface 316. In this manner, the computer can be a part of a network of computers (such as a local area network ("LAN"), a wide area network ("WAN"), or an Intranet, or a network of networks, such as the Internet. Any or all components of electronic system 300 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that some illustrated steps may not be performed. Some of the steps may be performed simultaneously. For example, in certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, where reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

What is claimed is:

1. A machine-implemented method, comprising:
   identifying a plurality of posts, each of the plurality of posts being associated with a quality score and a time, wherein the quality score is determined based on one or more of post popularity and freshness of each of the plurality of posts;
   ranking the plurality of posts according to the quality score associated with each post;
   selecting a first-ranked post of the plurality of posts as a candidate post;
   comparing the candidate post to respective posts of the plurality of posts ranked after the candidate post in the ranked order to determine if one or more posts of the plurality of posts meet a predetermined score threshold and a predetermined time threshold associated with the candidate post; and
   reordering the candidate post and the one or more posts that meet the predetermined score threshold and the predetermined time threshold according to the time associated with each of the candidate post and the one or more posts that meet the predetermined score threshold and the predetermined time threshold, when it is determined that one or more posts meet the predetermined score threshold and the predetermined time threshold.

2. The method of claim 1, further comprising:
   determining that all posts of the plurality of posts have been considered for reordering; and
   providing the plurality of posts according to the ranking.

3. The method of claim 2, wherein a post is considered for reordering if it is selected as the candidate post or meets the predetermined score threshold or the predetermined time threshold associated with the candidate post.

4. The method of claim 2, wherein a post is considered for reordering if it is selected as the candidate post or meets the predetermined score threshold and the predetermined time threshold associated with the candidate post.

5. The method of claim 2, further comprising:
   determining that one or more posts of the plurality of the posts have not yet been considered for reordering;
   selecting a second post of the plurality of posts not yet considered for reordering as the next candidate post;
   determining if one or more other posts of the plurality of posts not yet considered for reordering meet a predetermined second score threshold and a predetermined second time threshold; and
   reordering the next candidate post and the one or more other posts according to the time associated with the next candidate post and the one or more other posts, when it is determined that one or more other posts meet the predetermined second score threshold and the predetermined second time threshold.

6. The method of claim 1, wherein a post meets the predetermined score threshold if a difference between the quality score of the post and the candidate post is less than or equal to a pre-defined score difference.

7. The method of claim 1, wherein the predetermined score threshold is provided as a pre-defined ratio of the candidate post's score.

8. The method of claim 7, further comprising:
   determining a threshold score by multiplying the pre-defined ratio and the candidate post's score, wherein a post meets the predetermined score threshold if the quality score of the post is bigger than or equal to the threshold score.

9. The method of claim 1, wherein a post meets the predetermined time threshold if a difference between the time associated with the post and the time associated with the candidate post is smaller than or equal to a pre-defined time difference.

10. The method of claim 1, wherein the predetermined score threshold and the predetermined time threshold for each candidate post is dependent on a position of the post with respect to the other posts of the plurality of posts.

11. The method of claim 1, wherein the comparing step comprises comparing, in the ranked order, the quality score and the time associated with respective posts of the plurality of posts ranked after the candidate post to the predetermined score threshold and the predetermined time threshold of the candidate post; and
    terminating the comparing step when at least one post ranked after the candidate post does not meet the predetermined score threshold.

12. A system comprising:
    one or more processors; and
    a machine-readable medium comprising instructions stored therein, which when executed by the processors, cause the processors to perform operations comprising:
       identifying a plurality of posts, each of the plurality of post being associated with a quality score and a time, wherein the quality score is determined based on one or more of post popularity and freshness of each of the plurality of posts;
       ranking the plurality of posts are ranked according to the quality score associated with each post;
       selecting a first-ranked post of the plurality of posts as a candidate post;
       comparing, in the ranked order, the candidate post to respective posts of the plurality of posts ranked after the candidate post to determine one or more of the plurality of posts ranked after the candidate post satisfy a condition with respect to the quality score and time associated with the candidate post; and
       reordering the candidate post and the one or more posts according to the time associated with each of the candidate post and the one or more posts, when it is determined that a quality score and time associated with one or more posts of the plurality of posts ranked after the candidate post satisfy a condition with respect to the quality score and time associated with the candidate post.

13. The system of claim 12, wherein the condition comprises the quality score and the time associated with a post meeting a predetermined score threshold and a predetermined time threshold associated with the candidate post.

14. The system of claim 12, the operations further comprising:
    determining if all of the plurality of posts have been considered for reordering, wherein a post is considered for reordering if it is selected as the candidate post or meets a predetermined time and a predetermined score threshold with respect to the candidate post;
    selecting a post of the plurality of posts not considered for reordering as the candidate post if all of the plurality of posts have not been considered for reordering; and
    providing the one or more posts according to the ranking if all of the plurality of posts have been considered for reordering.

15. A machine-readable medium comprising instructions stored therein, which when executed by a machine, cause the machine to perform operations comprising:
- identifying a plurality of posts, each of the plurality of post being associated with a quality score and a time, wherein the quality score is determined based on one or more of post popularity and freshness of each of the plurality of posts;
- ranking the plurality of posts are ranked according to the quality score associated with each post;
- selecting a first-ranked post of the plurality of posts as a candidate post;
- comparing, in the ranked order, respective posts ranked after the candidate post to the candidate post to determine that one or more posts of the plurality of posts ranked after the candidate post satisfy a condition with respect to the quality score and time associated with the candidate post;
- reordering the candidate post and the one or more posts according to the time associated with each of the candidate post and the one or more posts;
- determining if all of the plurality of posts have been considered for reordering;
- providing the one or more posts according to the ranking if all of the plurality of posts have been considered for reordering; and
- selecting the next post of the plurality of posts not yet considered for reordering as the candidate post if all of the plurality of posts have not been considered for reordering.

16. The machine readable medium of claim 15, wherein the condition comprises the quality score and the time associated with a post meeting a predetermined score threshold and a predetermined time threshold associated with the candidate post.

* * * * *